United States Patent [19]

Kudo

[11] Patent Number: 4,992,815
[45] Date of Patent: Feb. 12, 1991

[54] SHEET LOADING MAGAZINE
[75] Inventor: Tomohiro Kudo, Yokohama, Japan
[73] Assignee: Canon Kabushiki Kaisha, Tokyo, Japan
[21] Appl. No.: 439,580
[22] Filed: Nov. 21, 1989
[30] Foreign Application Priority Data Nov. 26, 1988 [JP] Japan .................................. 63-299224

[51] Int. Cl.$^5$ .............................................. G03B 17/26
[52] U.S. Cl. ....................................................... 354/277
[58] Field of Search ................ 354/275, 276, 277, 281, 354/283, 284, 174; 378/174, 182; 355/72

[56] References Cited

U.S. PATENT DOCUMENTS 4,783,019 11/1988 Schmidt ............................... 378/182
4,853,724 8/1989 Tajima ................................. 354/277

Primary Examiner—L. T. Hix
Assistant Examiner—Jae N. Noh
Attorney, Agent, or Firm—Fitzpatrick, Cella, Harper & Scinto

[57] ABSTRACT

The sheet loading magazine of the present invention is characterized in that when loading sheets into the magazine, the end portion of a bag packing the recording sheets therein is cut and unsealed in a state in which light interception is kept with the end portion of the bag being nipped by a guide portion and a keep portion provided in the magazine, whereafter in a state in which the above-mentioned members are completely shielded from external light with a magazine lid closed, the other end of the bag is taken up onto a take-up shaft in the magazine and the sheets in the bag are loaded into the magazine.

6 Claims, 4 Drawing Sheets

SHEET LOADING MAGAZINE

BACKGROUND OF THE INVENTION

1. Field of the Invention

This invention relates to a sheet loading magazine used in a recording apparatus such as a laser beam printer and containing therein unused sheets packed for light interception, with the sheets being unsealed under roomlight.

2. Related Background Art

When an unexposed film is to be loaded into a sheet loading magazine used in a recording apparatus such as a laser beam printer, it is necessary to bring the film and the magazine into a dark room so that the film may not be sensitized and load the film into the magazine, but such operation must be purposely performed in a dark room, and in order to avoid this, use has heretofore been made of a sheet loading magazine as shown in FIG. 8 of the accompanying drawings into which films can be loaded under roomlight. In FIG. 8, the reference numeral 1 designates a housing which is shown in its initial loading state in which films 3 packed for light interception in an opaque and flexible bag 2 are contained. One end 2f bag 2 is held between a sliding shutter 4 provided in the magazine body and a side plate portion of the magazine 1, and protrudes outwardly by a predetermined amount. The operator cuts this end portion 2a as by means of scissors 5, and pulls the opposite end 2b of the bag through an opening 6 formed in the magazine body. At that time, the bag 2 is pulled out while being squeezed by squeeze rollers 7 and 7', and only the films are loaded into the magazine body. When the bag 2 is pulled out, a shutter 8 provided in the opening closes the opening so as to maintain the light interception within the magazine.

However, in the prior-art sheet loading magazine as shown in FIG. 8, although the bag 2 is hermetically sealed by the sliding shutter 4, between the side plates of the magazine 1 in the opening where the shutter 8 is provided. There is at least a necessary gap corresponding to the thickness of the bag 2 and light may enter through the gap to cause fog to the unused sheet films. Particularly, in the work of pulling out the bag 2, a load and vibration may be exerted on the sliding shutter 4 and the opening 6 and the possibility of the gap being widened is great.

SUMMARY OF THE INVENTION

An object of the present invention is the provision of a sheet loading magazine which is excellent in the light intercepting property with respect to the outside of the magazine when a bag for sheet packing is pulled out in the magazine.

Another object of the present invention is the provision of a sheet loading magazine in which said bag can be easily pulled out.

Still another object of the present invention is the provision of a recording apparatus having a sheet loading magazine which achieves the above objects.

DESCRIPTION OF THE PREFERRED EMBODIMENT

The sheet loading magazine of the present invention can generally be used in an apparatus which uses photosensitive recording sheets and of which the light intercepting property is required, like a recording apparatus such as a laser beam printer or an X-ray photographing apparatus, and an embodiment of a magazine for use in a laser beam printer will hereinafter be described.

Figure 1:
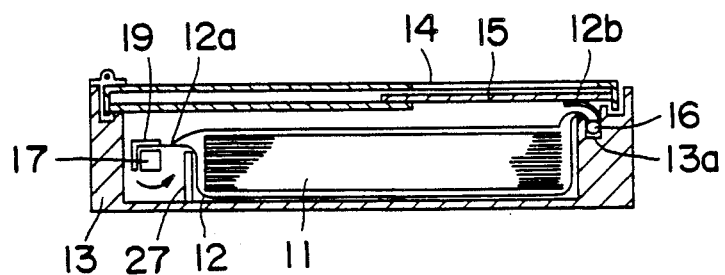
FIG. 1 is a cross-sectional view of an embodiment of a sheet loading magazine as it contains unused sheets therein.
Figure 2:
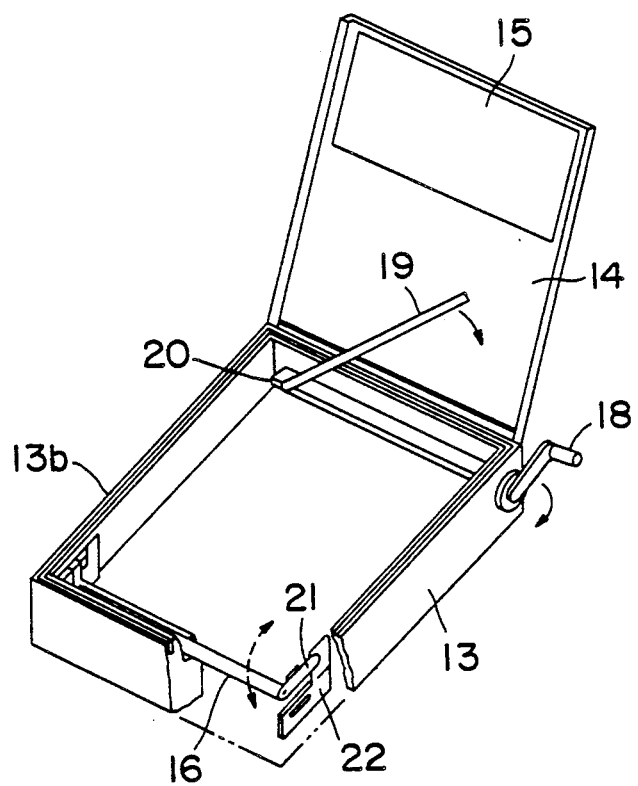
FIG. 2 is a perspective view of the magazine.

FIG. 1 is a cross-sectional view of an embodiment of the sheet loading magazine according to the present invention, and FIG. 2 is a perspective view thereof. In these figures, the reference numeral 11 designates unused recording sheets which are photosensitive films sensitized to laser light wavelength, and the reference numeral 12 denotes a flexible bag which packs the recording sheets for light interception and which is rich in slidability and has a light intercepting property. The end extensions 12a and 12b of the bag 12 cooperate with the actions of a clamp portion and a keep shaft portion which will be described later. Generally, recording sheets are thus packed in a light intercepting bag for sale. The reference numeral 13 designates a magazine housing containing the bag 12 therein, and the circumferential portion thereof has a groove portion 13b for shielding the interior of the magazine from light by a magazine lid 14 entering into the groove portion. Further, the housing 13 has a groove-like guide portion 13a at one end of the circumferential portion thereof. The magazine lid 14 is provided on the upper portion of the housing 13 and is openable and closable relative to the housing 13, and by the lid being closed, the interior of the housing 13 is shielded from light. Also, the magazine lid 14 is provided with a slidable shutter 15 which is adapted to open when the magazine is inserted into and set in the insertion port of the apparatus body of a laser beam printer, thereby forming a supply port for supplying the recording sheets to an image recording station.

Figure 7:
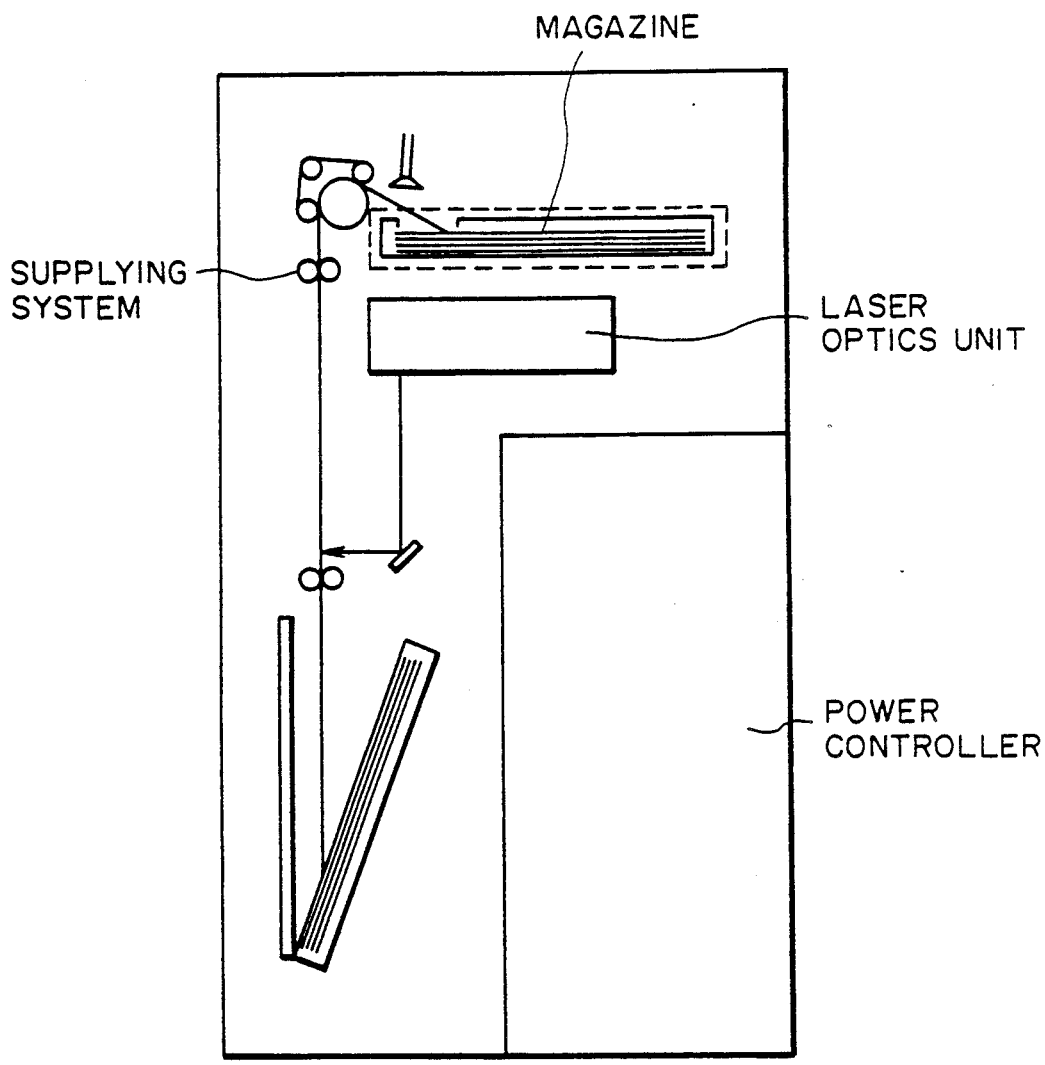
FIG. 7 shows an example of the construction of a laser beam printer.
Figure 8:
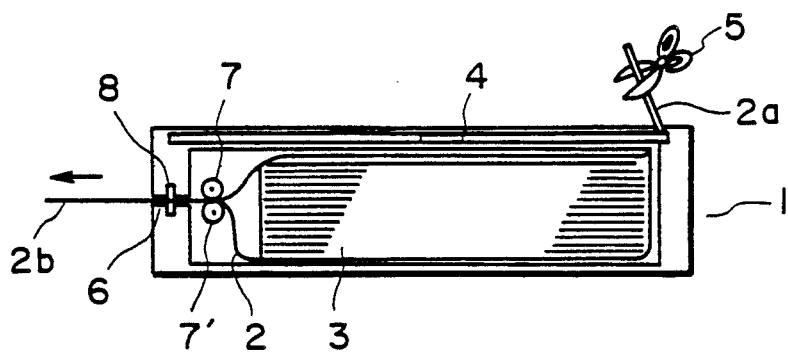
FIG. 8 shows a magazine according to the prior art.

The laser beam printer body, as shown in FIG. 7, has therein in addition to the insertion port for inserting the magazine thereinto, supplying means for supplying the sheets taken out of the supply port to the image recording station, and members such as a laser optics unit including a laser source and an optical system for effecting laser recording in the image recording station, a power source unit and a control unit. Various forms of these members are well known.

Figure 5:
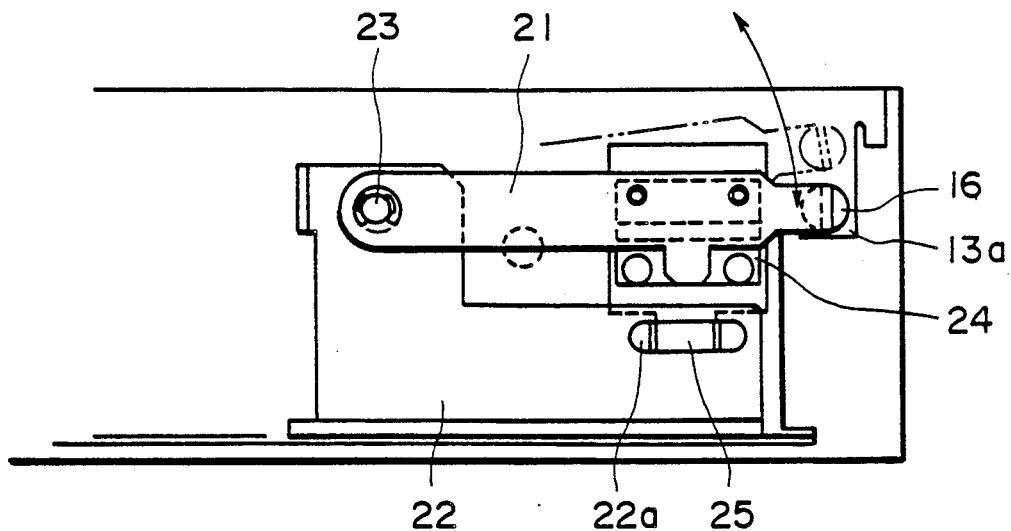
FIGS. 5 and 6 are detailed views of a keep shaft locking mechanism.
Figure 6:
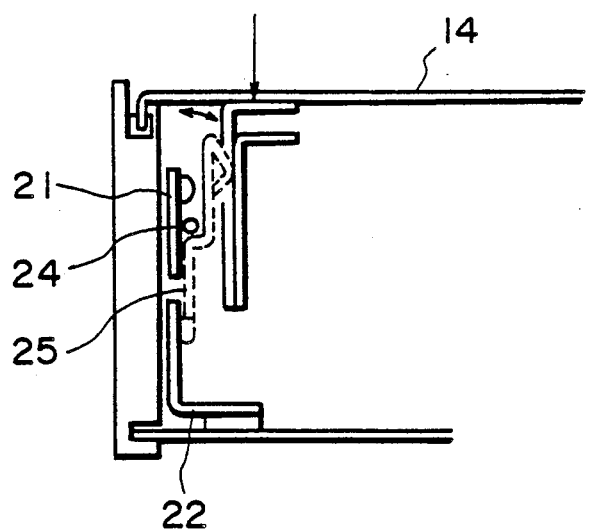

The reference numeral 16 denotes a keep shaft movable into and out of the groove-like guide portion 13a, and the cross-section of the keep shaft 16 is of a circular shape. FIGS. 5 and 6 are detailed views of the vicinity of the opposite end portions by which the keep shaft 16 is supported as they are seen from the side, and in these figures, the opposite sides of the keep shaft 16 are fixedly supported by a lever 21. The keep shaft 16 may be designed to be rotatable with the central portions of the opposite ends thereof supported by the lever 21, whereby resistance can be decreased more when the bag is pulled out. The lever 21 is rotatable about a shaft 23 provided on a base plate 22. Also, the lever 21 has a lock pawl 25 mounted thereon by means of a hinge 24, and when the keep shaft 16 comes into the groove-like guide portion 13a, the bent end portion of the lock pawl 25 fits into a slot 22a formed in the base plate 22, whereby locking is accomplished. Also, by the lid 14 entering into the housing 13, the lock pawl 25 is pushed and the bent end portion comes off the slot 22a, whereby unlocking is automatically accomplished. The keep shaft 16 is unlocked by the lid 14 entering into the housing, but if the guide portion is finished of a material rich in slidability and the gap between the guide 13a and the keep shaft 16 is kept to such a degree that no light enters the gap, the unlocking mechanism will become unnecessary.

Also, in FIGS. 1 and 2, the reference numeral 17 designates a take-up shaft of square cross-sectional shape. The take-up shaft 17 is rotated by the pivotal movement of a crank lever 18 mounted on the end portion of the shaft. The reference numeral 19 denotes a clamp plate provided on the take-up shaft 17 to press and hold the end portion 12a of the bag. The clamp plate 19 can be urged against and separated from the take-up shaft 17 using the center of rotation 20 of the end portion of the take-up shaft 17 as the center. The reference numeral 27 designates a film stopper member having its end surface R-finished so that the bag 12 is readily slidable.

Figure 3:
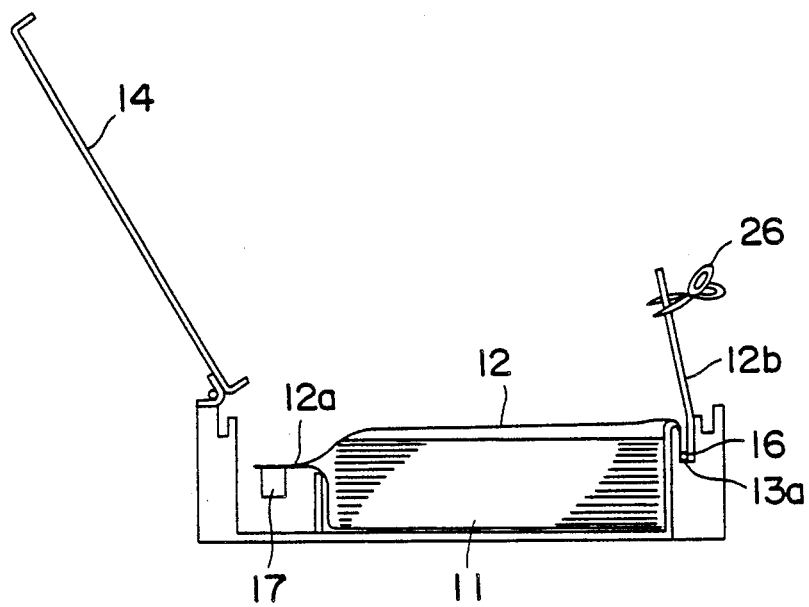
FIG. 3 is a cross-sectional view of the magazine when unused sheets are set therein with the lid thereof opened.

Description will now be made of a method of loading the unused recording sheets packed in the bag into the magazine. FIG. 3 is a cross-sectional view showing a state in which the magazine lid 14 is opened and the bag is contained in the magazine. One end 12a of the bag 12 is set on the take-up shaft 17, and the clamp plate 19 which has so far escaped from the take-up shaft covers the take-up shaft to thereby clamp said one end 12a. The other end 12b is held down along the groove-like guide portion 13a by the keep shaft 16, which has so far escaped from the 25 guide portion 13a coming into the guide portion 13a. Subsequently, said other end 12b is held down by the keep shaft 16, and the operator cuts the tip end of the end portion 12b which protrudes outwardly by a predetermined amount by means of scissors 26 and unseals the bag, but the end portion 12b is tightly held by the groovelike guide portion 13a and the keep shaft 16 and therefore, external light does not enter the interior of the bag. At this time, the keep shaft 16 is locked and therefore, there is no danger of the keep shaft being raised by the load during the cutting or a gap being created to permit the entry of external light.

After the termination of the cutting, the lid 14 is closed while the blank portion of the bag which has been left forwardly of the guide portion 13a is being pushed into the magazine. Thus, the bag does not protrude outwardly of the magazine and, therefore, there is no gap through which external light enters, and the interior of the magazine is completely shielded from external light. When the lid 14 is closed, the keep shaft 16 is unlocked in response thereto and becomes free, and there is created a gap through which the bag can pass.

Figure 4:
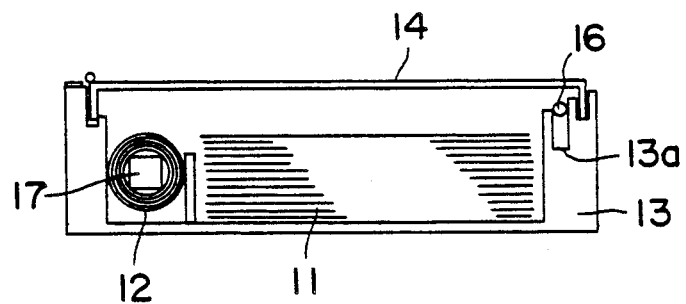
FIG. 4 is a cross-sectional view of the magazine with a bag having been pulled out therefrom.

The crank lever 18 mounted on the end portion of the take-up shaft 17 is then rotated. At this time, the recording sheets are fixed in place by the film stopper member and only the bag 12 is taken up around the take-up shaft 17. In this manner, the recording sheets 11 are loaded into the magazine body. This state is shown in FIG. 4. During the above described taking-up operation, the bag 12 moves only within the magazine and therefore is completely shielded from external light and no fog occurs to the recording sheets. The bag which has been taken up onto the take-up shaft 17 is removed when it is reloaded next time.

As described above, according to the present invention, the bag can be pulled out without that end portion of the bag which is cut outside the magazine protruding as in the prior art and, therefore, the effect of intercepting the light from the outside is high. Further, the bag can be pulled out easily.

What is claimed is:

1. A sheet loading magazine having:
    a housing for containing therein sheets placed in a flexible bag having a light intercepting property;
    a guide portion provide near the end portion of the interior of said housing;
    a keep portion shiftable to a position in which it is engaged with said guide portion with one end of said bag being interposed therebetween;
    a rotatable take-up portion provided within said housing for holding down one end of said bag when said keep portion is engaged with said guide portion, and clamping the other end of said bag and taking up said bag after said one end of said bag which protrudes outwardly is unsealed; and
    an openable-closable lid member provided on the upper portion of said housing for shielding from light the interior of said housing having said guide portion and said take-up portion when said bag is taken up onto said take-up portion.

2. A sheet loading magazine according to claim 1, wherein said keep portion retracts from said guide portion to form a gap through which said bag can pass when said bag is taken up onto said take-up portion.

3. A sheet loading magazine according to claim 1, wherein said sheets are photosensitive films.

4. A sheet recording apparatus having:
    a sheet containing magazine containing therein sheets on which recording is effected; and
    supplying means for supplying the sheets contained in said sheet containing magazine to a recording station;
    recording means for effecting recording on the sheets in said recording station;
    said sheet continuing magazine having:
    a housing for containing the sheets placed in a flexible bag having a light intercepting property;
    a guide portion provided near the end portion of the interior of said housing;
    a keep portion shiftable to a position in which it is engaged with said guide portion with one end of said bag being interposed therebetween;
    a rotatable take-up portion provided within said housing for holding down one end of said bag when said keep portion is engaged with said guide portion, and clamping the other end of said bag and taking up said bag after said one end of said bag which protrudes outwardly is unsealed; and
    an openable-closable lid member provided on the upper portion of said housing for shielding from light the interior of said housing having said guide portion and said take-up portion when said bag is taken up onto said take-up portion.

5. A sheet recording apparatus according to claim 4, wherein said recording means has a laser source and an irradiating optical system, and effects image recording on the sheets by applying a laser light thereto.

6. A sheet recording apparatus according to claim 4, wherein said keep portion retracts from said guide portion to form a gap through which said bag can pass when said bag is taken up onto said takeup portion.

* * * * *

UNITED STATES PATENT AND TRADEMARK OFFICE
CERTIFICATE OF CORRECTION

PATENT NO. : 4,992,815
DATED : February 12, 1991
INVENTOR(S) : Tomohiro KUDO

It is certified that error appears in the above-identified patent and that said Letters Patent is hereby corrected as shown below:

COLUMN 1:

Line 26, "end 2fbag2" should read --end 2a of the bag 2--; and

Line 42, "provided. There" should read --provided, there--.

COLUMN 4:

Line 50, "sheet continuing magazine" should read --sheet containing magazine--.

COLUMN 6:

Line 3, "takeup" should read --take-up--.

Signed and Sealed this

Twenty-fifth Day of August, 1992

Attest:

DOUGLAS B. COMER

*Attesting Officer*      *Acting Commissioner of Patents and Trademarks*